(12) United States Patent
Uezono et al.

(10) Patent No.: US 9,917,306 B2
(45) Date of Patent: Mar. 13, 2018

(54) MANUFACTURING METHOD OF ELECTRODE AND WET GRANULES

(71) Applicant: TOYOTA JIDOSHA KABUSHIKI KAISHA, Toyota-shi, Aichi-ken (JP)

(72) Inventors: Tomoyuki Uezono, Toyota (JP); Katsushi Enokihara, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 88 days.

(21) Appl. No.: 14/993,409

(22) Filed: Jan. 12, 2016

(65) Prior Publication Data

US 2016/0204434 A1 Jul. 14, 2016

(30) Foreign Application Priority Data

Jan. 14, 2015 (JP) .................................. 2015-004862

(51) Int. Cl.
| | |
|---|---|
| *H01M 4/505* | (2010.01) |
| *H01M 4/04* | (2006.01) |
| *H01M 4/139* | (2010.01) |
| *H01M 10/0525* | (2010.01) |
| *H01M 4/525* | (2010.01) |
| H01M 4/02 | (2006.01) |

(52) U.S. Cl.
CPC ......... *H01M 4/505* (2013.01); *H01M 4/0409* (2013.01); *H01M 4/139* (2013.01); *H01M 4/525* (2013.01); *H01M 10/0525* (2013.01); *H01M 2004/021* (2013.01); *H01M 2220/20* (2013.01)

(58) Field of Classification Search
CPC .......................... H01M 4/505; H01M 4/0409
See application file for complete search history.

(56) References Cited

U.S. PATENT DOCUMENTS

| | | |
|---|---|---|
| 2003/0054243 A1 | 3/2003 | Suzuki et al. |
| 2005/0058907 A1 | 3/2005 | Kurihara et al. |
| 2006/0046142 A1 | 3/2006 | Kasai et al. |

(Continued)

FOREIGN PATENT DOCUMENTS

| | | |
|---|---|---|
| CN | 102763245 A | 10/2012 |
| JP | 2002-110145 A | 4/2002 |

(Continued)

OTHER PUBLICATIONS

An Office Action dated Jul. 26, 2016, which issued during the prosecution of U.S. Appl. No. 14/994,350.

(Continued)

*Primary Examiner* — Olatunji Godo
(74) *Attorney, Agent, or Firm* — Sughrue Mion, PLLC

(57) ABSTRACT

A manufacturing method of an electrode according to the invention includes: a process of forming wet granules by stirring a mixture of an electrode active material, a binding material, and a solvent; and a process of forming an electrode material layer on a current collector by rolling the wet granules. The process of forming the wet granules includes: a process of granulating the electrode active material by stirring the mixture at a first stirring speed; and a process of stirring the granulated electrode active material at a second stirring speed that is faster than the first stirring speed so as to be refined to an average particle size of 400 μm or smaller. A stirring time at the second stirring speed is shorter than a stirring time at the first stirring speed and is shorter than 5 seconds.

6 Claims, 6 Drawing Sheets

(56) References Cited

U.S. PATENT DOCUMENTS

| | | |
|---|---|---|
| 2011/0070487 A1 | 3/2011 | Padhi et al. |
| 2012/0308861 A1 | 12/2012 | Xing et al. |
| 2012/0315530 A1 | 12/2012 | Kageura |
| 2013/0247721 A1 | 9/2013 | Kudo et al. |
| 2014/0225300 A1 | 8/2014 | Shibata et al. |
| 2016/0197344 A1 | 7/2016 | Krkljus |
| 2016/0204434 A1 | 7/2016 | Uezono et al. |
| 2016/0211504 A1 | 7/2016 | Uezono et al. |
| 2016/0240859 A1 | 8/2016 | Uezono |

FOREIGN PATENT DOCUMENTS

| | | |
|---|---|---|
| JP | 2004006301 A | 1/2004 |
| JP | 2005-302426 A | 10/2005 |
| JP | 2007305546 A | 11/2007 |
| JP | 2008166207 A | 7/2008 |
| JP | 2008251409 A | 10/2008 |
| JP | 2011192644 A | 9/2011 |
| JP | 2012-138217 A | 7/2012 |
| JP | 2013033692 A | 2/2013 |
| JP | 2013077560 A | 4/2013 |
| JP | 2013114764 A | 6/2013 |
| JP | 2014165131 A | 9/2014 |
| KR | 1020030023504 A | 3/2003 |
| KR | 1020040096203 A | 11/2004 |
| KR | 1020050014743 A | 2/2005 |
| WO | 2011078263 A1 | 6/2011 |
| WO | 2012081645 A1 | 6/2012 |
| WO | 2013031854 A1 | 3/2013 |
| WO | 2015/018706 A1 | 2/2015 |

OTHER PUBLICATIONS

An Office Action dated Sep. 7, 2016, which issued during the prosecution of U.S. Appl. No. 15/041,560.

Office Action issued to U.S. Appl. No. 15/041,560 dated Mar. 10, 2016.

Office Action issued in U.S. Appl. No. 15/041,560 dated Nov. 30, 2017.

FIG. 6

TABLE 1

| | GRANULATION STIRRING | | REFINEMENT STIRRING | | MALLEA-BILITY OF GRANULES (kN) | AVERAGE PARTICLE SIZE D50 OF GRANULES (μm) | BULK DENSITY OF GRANULES (g/ml) | FILM-FORMING PROPERTIES |
|---|---|---|---|---|---|---|---|---|
| | PERIPH-ERAL SPEED (m/s) | TIME (s) | PERIPH-ERAL SPEED (m/s) | TIME (s) | | | | |
| COMPARATIVE EXAMPLE 1 | – | – | 20 | 15 | 1.9 | 349 | 0.97 | UNAVAILABLE |
| COMPARATIVE EXAMPLE 2 | 5 | 15 | – | – | 2.2 | IMPOSSIBLE TO MEASURE | 0.79 | UNAVAILABLE |
| EXAMPLE 1 | 5 | 15 | 20 | 3 | 0.7 | 285 | 0.76 | GOOD |
| EXAMPLE 2 | 10 | 15 | 20 | 3 | 0.7 | 291 | 0.79 | GOOD |
| EXAMPLE 3 | 15 | 15 | 20 | 3 | 0.8 | 273 | 0.76 | GOOD |
| COMPARATIVE EXAMPLE 3 | 5 | 15 | 10 | 3 | 0.7 | 596 | 0.76 | UNAVAILABLE |
| EXAMPLE 4 | 5 | 15 | 15 | 3 | 0.7 | 379 | 0.76 | GOOD |
| EXAMPLE 5 | 5 | 15 | 20 | 1 | 0.5 | 279 | 0.73 | GOOD |
| COMPARATIVE EXAMPLE 4 | 5 | 15 | 20 | 5 | 1.4 | 289 | 0.91 | UNAVAILABLE |
| COMPARATIVE EXAMPLE 5 | 5 | 15 | 20 | 10 | 2.1 | 296 | 0.99 | UNAVAILABLE |
| COMPARATIVE EXAMPLE 6 | 5 | 15 | 20 | 15 | 2.2 | 280 | 1.04 | UNAVAILABLE |

FIG. 7

TABLE 2

| | GRANULATION STIRRING | | REFINEMENT STIRRING | | MALLEA-BILITY OF GRANULES (kN) | AVERAGE PARTICLE SIZE D50 OF GRANULES (μm) | BULK DENSITY OF GRANULES (g/ml) | FILM-FORMING PROPERTIES |
|---|---|---|---|---|---|---|---|---|
| | PERIPH-ERAL SPEED (m/s) | TIME (s) | PERIPH-ERAL SPEED (m/s) | TIME (s) | | | | |
| EXAMPLE 6 | 5 | 15 | 20 | 1 | 0.7 | 325 | 0.33 | GOOD |
| EXAMPLE 7 | 5 | 15 | 20 | 3 | 0.9 | 298 | 0.33 | GOOD |
| COMPARATIVE EXAMPLE 7 | 5 | 15 | 20 | 15 | 1.1 | 296 | 0.35 | UNAVAILABLE |
| COMPARATIVE EXAMPLE 8 | 5 | 15 | 20 | 60 | 1.3 | 284 | 0.36 | UNAVAILABLE |

MANUFACTURING METHOD OF ELECTRODE AND WET GRANULES

INCORPORATION BY REFERENCE

The disclosure of Japanese Patent Application No. 2015-004862 filed on Jan. 14, 2015 including the specification, drawings and abstract is incorporated herein by reference in its entirety.

BACKGROUND OF THE INVENTION

1. Field of the Invention

The invention relates to a manufacturing method of an electrode and wet granules.

2. Description of Related Art

A non-aqueous electrolyte secondary battery such as a lithium-ion secondary battery is used in a hybrid vehicle (HV), a plug-in hybrid vehicle (PHV), an electric vehicle (EV), or the like. The non-aqueous electrolyte secondary battery includes a positive electrode and a negative electrode, which form a pair of electrodes, a separator which insulates the electrodes from each other, and a non-aqueous electrolyte. As the structure of the electrode (the positive electrode or the negative electrode) for the non-aqueous electrolyte secondary battery, a structure including a current collector formed of a metal foil or the like, and an electrode layer (electrode active material layer) which is formed thereon and contains an electrode active material is known.

In Japanese Patent Application Publication No. 2002-110145 (JP 2002-110145 A), a non-aqueous electrolyte secondary battery having a positive electrode plate in which a positive electrode mixture containing a positive electrode active material, a conductive material, and a binding material is applied onto a current collector and dried is disclosed. Here, after dry-mixing the positive electrode active material and the conductive material, an organic solvent is added thereto to be wet-dispersed. Furthermore, a dispersed binding material solution is added to the organic solvent and the resultant is kneaded, thereby manufacturing the positive electrode mixture.

However, there is known a manufacturing method of an electrode in which wet granules (for example, corresponding to the positive electrode mixture of JP 2002-110145 A) are supplied between a first roll and a second roll which rotate in opposite directions to each other, and the wet granules are allowed to adhere to the first roll while being rolled, thereby forming an electrode material layer. By drying the electrode material layer, an electrode layer is formed. A method of transporting the current collector is not particularly limited. For example, the electrode material layer may also be formed on the current collector while transporting the current collector using the first roll or the second roll. Otherwise, by transporting the current collector using a third roll that rotates reversely to the first roll, the electrode material layer adhered to the first roll may be transferred onto the current collector on the third roll.

The inventors found the following possibility regarding a manufacturing method of an electrode in which an electrode material layer is formed by rolling the wet granules described above. In a case of manufacturing wet granules according to the method of the related art disclosed in JP 2002-110145 A, since stirring is performed at a high speed for a long period of time during the kneading process, the wet granules are consolidated. Therefore, the malleability of the wet granules during rolling is degraded, and pinholes may be generated in the formed electrode material layer.

On the contrary, when stirring is performed at a low speed in the kneading process, the particle size of the wet granules becomes coarsened. Therefore, there is concern that coarse granules are caught on the rolls during rolling, and streaks may be generated in the electrode material layer. That is, there is a possibility that the wet granules according to the related art may cause the degradation in the film-forming properties of the electrode material layer formed by rolling.

SUMMARY OF THE INVENTION

The invention enhances the film-forming properties of an electrode material layer formed by rolling wet granules.

A manufacturing method of an electrode according to an aspect of the invention includes: a process of forming wet granules by stirring a mixture of an electrode active material, a binding material, and a solvent; and a process of forming an electrode material layer on a current collector by rolling the wet granules, in which the process of forming the wet granules includes a process of granulating the electrode active material by stirring the mixture at a first stirring speed, and a process of stirring the granulated electrode active material at a second stirring speed that is faster than the first stirring speed so as to be refined to an average particle size of 400 μm or smaller, and a stirring time at the second stirring speed is shorter than a stirring time at the first stirring speed, and is shorter than 5 seconds.

Since the particle size of the wet granules is refined in the refining process, streaks generated in the electrode material layer may be reduced. In addition, since the stirring time in the refining process is short, consolidation of the wet granules can be prevented. Therefore, the malleability of the wet granules during rolling is enhanced, and thus pinholes in the formed electrode material layer can be reduced. That is, the film-forming properties of the electrode material layer through rolling can be further enhanced.

The first stirring speed which is a speed of a tip end of a stirring blade may be 10 m/s or lower. The attachment of the wet granules to a stirring container is suppressed, and thus the yield is enhanced. The second stirring speed which is a speed of a tip end of a stirring blade may be 15 m/s or higher. Streaks generated in the electrode material layer can further be reduced. In addition, the stirring time at the second stirring speed may be 3 seconds or shorter. Pinholes generated in the electrode material layer can further be reduced. A solid content fraction of the wet granules may be 70 mass % or higher. A ratio of the sum of the binding material and a dispersant in terms of solid content may be 3 mass % or lower.

Wet granules according to another aspect of the invention include a positive electrode active material, a binding material, and a solvent, are used for forming an electrode material layer through rolling, and have an average particle size of 400 μm or smaller and a bulk density of 0.8 g/mL or lower.

In this configuration, since the average particle size is 400 μm or smaller, streaks generated in the electrode material layer can be reduced. In addition, since the bulk density is 0.8 g/mL or lower, the malleability of the wet granules during rolling is enhanced, and thus pinholes in the formed electrode material layer can be reduced. That is, the film-forming properties of the electrode material layer through rolling can be further enhanced. A solid content fraction thereof may be 70 mass % or higher. A ratio of the sum of the binding material and a dispersant in terms of solid content may be 3 mass % or lower.

According to the invention, the film-forming properties of the electrode material layer formed by rolling the wet granules can be enhanced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a table showing test conditions and results of Examples 1 to 5 and Comparative Examples 1 to 6 regarding the positive electrode; and FIG. 7 is a table showing test conditions and results of Examples 6 and 7 and Comparative Examples 7 and 8 regarding the negative electrode.

DETAILED DESCRIPTION OF EMBODIMENTS

First Embodiment

Figure 1:
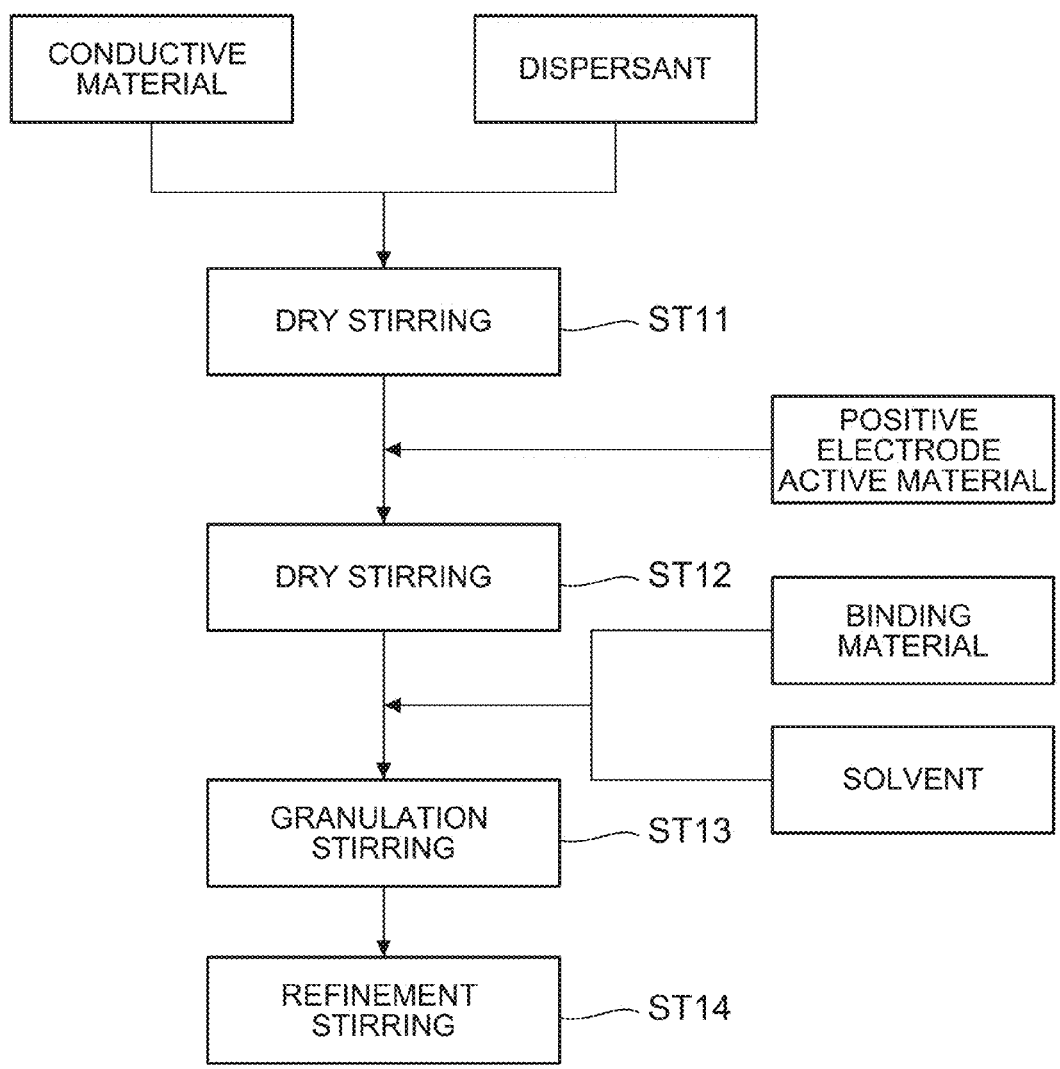
FIG. 1 is a flowchart illustrating a manufacturing method of wet granules for a positive electrode.

Hereinafter, a specific embodiment to which the invention is applied will be described in detail with reference to the drawings. However, the invention is not limited to the following embodiment. In addition, for clarifying the description, the following description and drawings are appropriately simplified.

First, electrodes (a positive electrode and a negative electrode) manufactured from wet granules according to the invention will be described. In this embodiment, a non-aqueous electrolyte secondary battery is exemplified by a lithium-ion secondary battery. In any of the electrodes, that is, the positive electrode and the negative electrode, an electrode layer (active material layer) is formed on a current collector. The electrode layer is formed on one surface or both surfaces of the current collector.

<Positive Electrode>

As the current collector, a metal foil such as an aluminum foil is preferably used. A positive electrode active material is not particularly limited, and examples thereof include lithium-containing complex oxides such as $LiCoO_2$, $LiMnO_2$, $LiMn_2O_4$, $LiNiO_2$, $LiNi_xCo_{(1-x)}O_2$, and $LiNi_xCo_yMn_{(1-x-y)}O_2$ (in the formula, $0<x<1$, and $0<y<1$). The composition of an electrode material for a positive electrode active material layer is not particularly limited, and a well-known composition may be applied.

The electrode material for the positive electrode active material layer may contain, in addition to the positive electrode active material mentioned above, a binding material such as an acrylic polymer containing a fluoropolymer or polyvinylidene fluoride (PVDF) as solid content. Furthermore, as necessary, the electrode material for the positive electrode active material layer may contain a conductive material such as carbon powder, and a dispersant such as carboxymethylcellulose sodium salt (CMC) as solid content.

As a solvent, water, an N-methyl-2-pyrrolidone (NMP) solution, or the like may be used.

<Negative Electrode>

As the current collector, a metal foil such as a copper foil is preferably used. A negative electrode active material is not particularly limited, and a material having a lithium occlusion ability of 2.0 V or less in terms of Li/Li+ is preferably used. As the negative electrode active material, carbon such as graphite, lithium metal, lithium alloys, transition metal oxides/transition metal nitrides/transition metal sulfides capable of being doped with and dedoped from lithium ions, and combinations thereof may be employed. The composition of an electrode material for a negative electrode active material layer is not particularly limited, and a well-known composition may be applied.

The electrode material for the negative electrode active material layer may contain, in addition to the negative electrode active material mentioned above, a binding material such as a styrene-butadiene copolymer (SBR) as solid content. Furthermore, as necessary, the electrode material for the negative electrode active material layer may contain a dispersant such as carboxymethylcellulose sodium salt (CMC) as solid content.

As a solvent, water or the like may be used.

<Manufacturing Method of Wet Granules>

Figure 2:
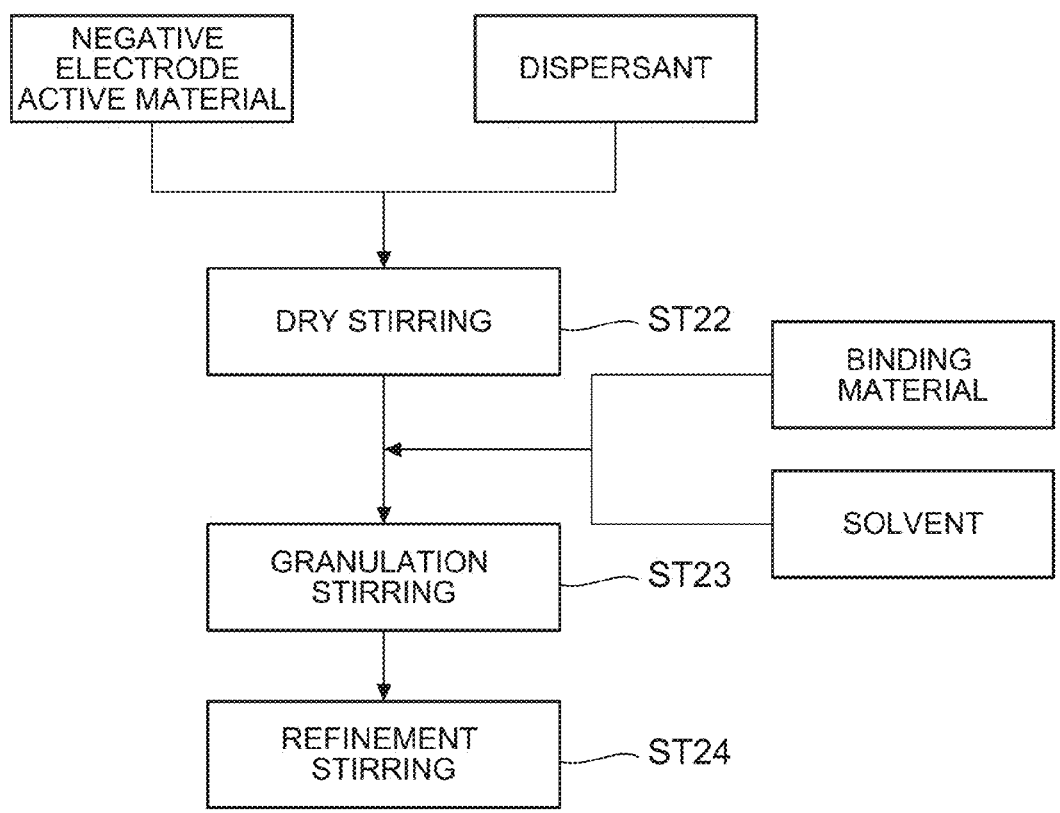
FIG. 2 is a flowchart illustrating a manufacturing method of wet granules for a negative electrode.

Next, a manufacturing method of the wet granules according to the invention will be described with reference to FIGS. 1 and 2. FIG. 1 is a flowchart illustrating a manufacturing method of wet granules for the positive electrode. FIG. 2 is a flowchart illustrating a manufacturing method of wet granules for the negative electrode.

First, a case of the wet granules for the positive electrode will be described with reference to FIG. 1. As illustrated in FIG. 1, first, the conductive material such as carbon powder, and the dispersant such as carboxymethylcellulose sodium salt (CMC) are poured into a stirring device provided with rotary stirring blades and dry-stirred (Step ST11). For example, it is preferable that the stirring is performed at a stirring speed of about 20 m/s for a time period of about 120 seconds. Here, the stirring speed is the speed of the tip end of the stirring blade, and can be obtained from the length of the stirring blade and the number of rotations of the stirring blade per unit time.

Next, the positive electrode active material such as the lithium-containing complex oxide is poured into the stirring device, and dry-stirred with the conductive material and the dispersant (Step ST12). For example, it is preferable that the stirring is performed at a stirring speed of about 20 m/s for a stirring time of about 15 seconds.

Next, the binding material such as an acrylic polymer containing a fluoropolymer, and the solvent such as water are poured into the stirring device and stirred for granulation of the positive electrode active material (Step ST13). It is preferable that the stirring speed (first stirring speed) during the granulation stirring is 10 m/s or lower. The attachment of the wet granules to a stirring container is suppressed, and thus the yield is enhanced. It is preferable that the stirring time is about 15 seconds.

Last, in order to refine the granulated positive electrode active material to an average particle size of 400 μm or smaller, stirring is performed at a faster stirring speed for a shorter period of time than those of the granulation stirring (Step ST14). The stirring time is shorter than 5 seconds. The stirring time is preferably 3 seconds or shorter, and more preferably 1 second or shorter. It is preferable that the stirring speed (second stirring speed) of the refinement stirring is 15 m/s or higher. In the above-described process, the wet granules for the positive electrode can be manufactured.

In the manufacturing method of the wet granules according to the invention, the average particle size (50% particle size) of the wet granules for the positive electrode can be 400 μm or smaller, and the bulk density thereof may be 0.8 g/mL or lower. By allowing the average particle size of the wet granules for the positive electrode to be 400 μm or smaller, it becomes difficult for coarse granules to be caught on rolls during rolling. Therefore, streaks generated in an electrode material layer can be reduced. The average particle size of the wet granules for the positive electrode is more preferably 380 μm or smaller. On the other hand, by allowing the bulk density to be 0.8 g/mL or lower, malleability during rolling is enhanced, and thus pinholes generated in the electrode material layer can be reduced.

Next, a case of the wet granules for the negative electrode will be described with reference to FIG. 2. As illustrated in FIG. 2, first, the negative electrode active material such as carbon and the dispersant such as carboxymethylcellulose sodium salt (CMC) are poured into the stirring device provided with the rotary stirring blades and dry-stirred (Step ST22). For example, it is preferable that the stirring is performed at a stirring speed of about 20 m/s for a time period of about 5 seconds.

Next, the binding material such as such as a styrene-butadiene copolymer (SBR) and the solvent such as water are poured into the stirring device and stirred for granulation of the negative electrode active material (Step ST23). It is preferable that the stirring speed (first stirring speed) during the granulation stirring is 10 m/s or lower, as in the case of the wet granules for the positive electrode. The attachment of the wet granules to the stirring container is suppressed, and thus the yield is enhanced. It is preferable that the stirring speed is about 15 seconds.

Last, in order to refine the granulated negative electrode active material to an average particle size of 400 μm or smaller, as in the case of the wet granules for the positive electrode, stirring is performed at a faster stirring speed for a shorter period of time than those of the granulation stirring (Step ST24). The stirring time is shorter than 5 seconds. The stirring time is preferably 3 seconds or shorter, and more preferably 1 second or shorter. It is preferable that the stirring speed (second stirring speed) of the refinement stirring is 15 m/s or higher. In the above-described process, the wet granules for the negative electrode can be manufactured.

As described above, the manufacturing method of the wet granules according to the invention includes the process (Steps ST13 and ST23) of stirring the mixture including at least the electrode active material, the binding material, and the solvent at the first stirring speed for the granulation of the electrode active material, and the process (Steps ST14 and ST24) of stirring the granulated electrode active material at the second stirring speed that is faster than the first stirring speed for refinement to an average particle size of 400 μm or smaller. Here, the stirring time at the second stirring speed is shorter than the stirring time at the first stirring speed, and is shorter than 5 seconds.

Since the stirring time at the second stirring speed that is faster than the first stirring speed is shorter than 5 seconds, consolidation of the wet granules can be prevented. Therefore, the malleability of the wet granules during rolling is enhanced, and thus pinholes in the formed electrode material layer can be reduced. That is, the film-forming properties of the electrode material layer through rolling can be further enhanced compared to the related art.

In the related art, a mixture including at least an electrode active material, a binding material, and a solvent is stirred at a single stirring speed to form wet granules. In a case where stirring is performed for a longer period of time at substantially the same stirring speed as that in the refining process (Steps ST14 and ST24) according to the invention, the wet granules are consolidated, and malleability during rolling is degraded. Therefore, pinholes are generated in an electrode material layer.

On the other hand, even when stirring is performed for a long period of time at substantially the same stirring speed as that in the granulation process (Steps ST13 and ST23) according to the invention, the particle size of granules becomes coarsened. Therefore, coarse granules are caught on rolls during rolling, and streaks are generated in the electrode material layer. Contrary to this, since the manufacturing method of the wet granules according to the invention includes the refining process (Steps ST14 and ST24) of refining the average particle size of the granules to 400 μm or smaller, streaks in addition to pinholes can be reduced.

It is preferable that the solid content fraction of the wet granules according to the invention is 70% or higher and 95% or lower. When the solid content fraction is lower than 70% or higher than 95%, it is difficult to perform rolling. In addition, it is preferable that the ratio of the sum of the binding material and the dispersant in terms of solid content is 3 mass % or lower. When the ratio is higher than 3 mass %, battery characteristics are deteriorated, and malleability is deteriorated.

<Manufacturing Method of Electrode and Electrode Manufacturing Apparatus>

Figure 3:
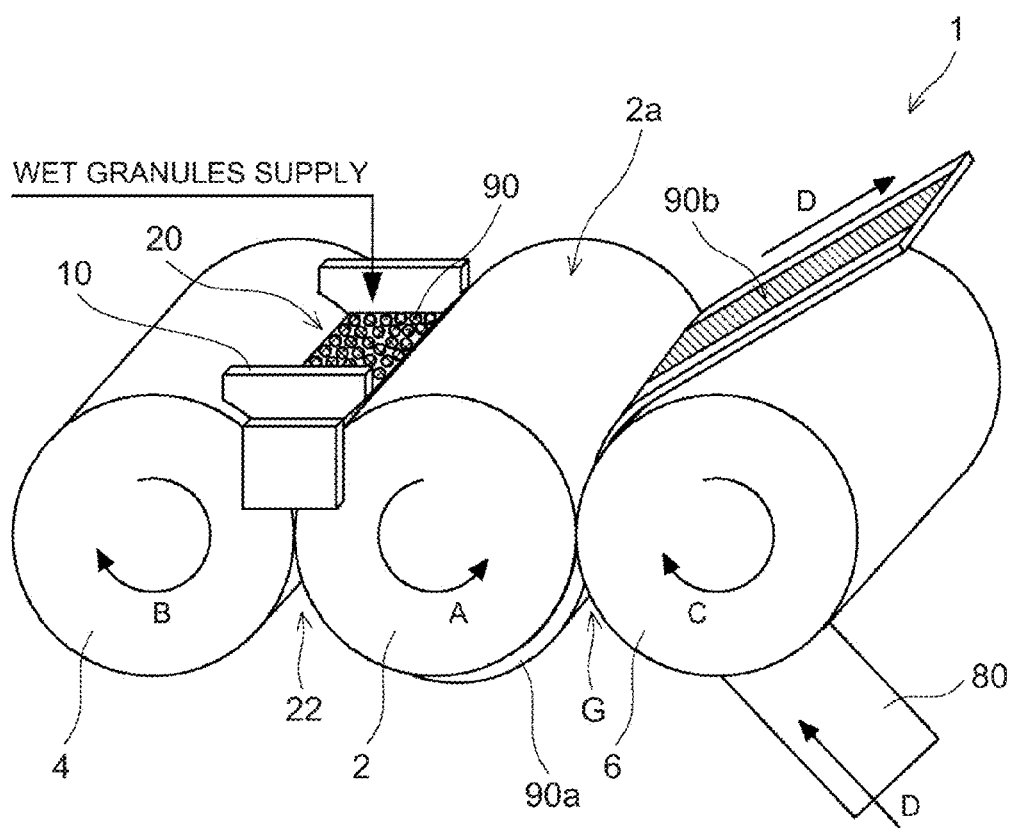
FIG. 3 is a perspective view illustrating an electrode manufacturing apparatus 1 for manufacturing an electrode using the wet granules according to the invention.

Next, a manufacturing method of an electrode according to a first embodiment of the invention will be described with reference to FIG. 3. FIG. 3 is a perspective view illustrating an electrode manufacturing apparatus 1 for manufacturing an electrode using the wet granules according to the invention. The electrode manufacturing apparatus 1 includes an application roll 2 (first roll), a drawing roll 4 (second roll), a transfer roll 6 (third roll), and a storage portion 20 which stores wet granules 90. The application roll 2 is provided between the drawing roll 4 and the transfer roll 6. The storage portion 20 is provided between the application roll 2 and the drawing roll 4. In addition, the application roll 2 and the drawing roll 4 face each other, and a clearance 22 (gap) is provided between the application roll 2 and the drawing roll 4. Accordingly, the clearance 22 can be provided below the storage portion 20.

The application roll 2 rotates in an arrow A direction (counterclockwise in FIG. 3). The drawing roll 4 rotates in an arrow B direction (clockwise in FIG. 3). That is, a rotational direction of the drawing roll 4 is opposite to a rotational direction of the application roll 2. In addition, the transfer roll 6 rotates in an arrow C direction (clockwise in FIG. 3). That is, a rotational direction of the transfer roll 6 is opposite to the rotational direction of the application roll 2.

The drawing roll 4 draws and rolls the wet granules 90 stored in the storage portion 20 in a downward direction in cooperation with the application roll 2. That is, as the application roll 2 and the drawing roll 4 rotate, the wet granules 90 stored in the storage portion 20 are extruded from the clearance 22 in the downward direction while being rolled. At this time, the rolled wet granules 90, that is, an electrode material layer 90a adheres to the surface of the application roll 2. The application roll 2 holds the adhered electrode material layer 90a on a roll surface 2a. The application roll 2 rotates in the arrow A direction while holding the electrode material layer 90a, thereby transporting the electrode material layer 90a to the transfer roll 6 side.

On the other hand, the transfer roll 6 transports a current collector 80, which is a metal foil, for example, in an arrow D direction by rotating in the arrow C direction. When the electrode material layer 90a is transported to a gap G between the application roll 2 and the transfer roll 6 by the application roll 2, the application roll 2 applies (transfers) the electrode material layer 90a onto the current collector 80 at the gap G in cooperation with the transfer roll 6. An electrode material layer 90b transferred to the current collector 80 is transported in a drying process (not illustrated) and becomes an electrode layer (active material layer) by the drying. Accordingly, an electrode including the current collector 80 and the electrode layer is manufactured.

In addition, as illustrated in FIG. 3, the storage portion 20 is constituted by the application roll 2, the drawing roll 4, and a pair of blades 10. The pair of blades 10 is formed of plate-like members provided to straddle both the rolls in the vicinity of the end surfaces of the application roll 2 and the drawing roll 4. The pair of blades 10 is substantially parallel to the end surfaces of the application roll 2 and the drawing roll 4 and are disposed to oppose each other between both the rolls. In this configuration, the storage portion 20 stores the wet granules 90 supplied from the outside.

The pair of blades 10 specifies an application width of the electrode material layer 90a applied to the current collector 80. Specifically, the width of the electrode material layer 90a attached to the application roll 2 is specified according to the interval between the pair of blades 10. That is, the width of the electrode material layer 90a attached to the application roll 2 becomes equal to or smaller than the interval between the pair of blades 10. In addition, the application roll 2 holds the electrode material layer 90a while maintaining the width thereof and applies the electrode material layer 90a to the current collector 80. Therefore, the width (application width) of the electrode material layer 90b applied to the current collector 80 is specified by the width of the pair of blades 10.

In addition, the film thickness of the electrode material layer 90a attached to the application roll 2 is specified by the width of the clearance 22 (the interval between the application roll 2 and the drawing roll 4). From the width and the film thickness of the electrode material layer 90a attached to the application roll 2, the coating amount (mass per unit area) is specified. Furthermore, depending on the interval of the gap G between the application roll 2 and the transfer roll 6, the film thickness and the density of the electrode material layer 90b applied to the current collector 80 are specified. As described above, the electrode manufacturing apparatus 1 specifies the film-forming conditions (the application width, film thickness, density, and the like) of the electrode material layer 90b applied to the current collector 80.

Hereinafter, Examples according to the invention will be described. In Table 1 of FIG. 6, test conditions and results of Examples 1 to 5 and Comparative Examples 1 to 6 for the positive electrode are shown.

$LiNi_{1/3}Co_{1/3}Mn_{1/3}O_2$ was used as the positive electrode active material, and acetylene black (Denka Black HS-100 manufactured by Denka Company Limited.) was used as the conductive material. Furthermore, carboxymethylcellulose sodium salt (CMC) (MAC800LC manufactured by Nippon Paper Industries Co., Ltd.) as the dispersant, and an acrylic polymer containing a fluoropolymer (TRD202A manufactured by JSR Corporation) as the binding material, were added. As the solvent, ion-exchange water was used.

In terms of solid content, the content of the positive electrode active material was 91 wt %, the content of the conductive material was 8 wt %, the content of the dispersant was 0.5 wt %, and the content of the binding material was 0.5 wt %. The solid content fraction was 75 wt %.

Wet granules were manufactured by the manufacturing method of the wet granules for the positive electrode illustrated in FIG. 1. As the stirring device which can change the stirring speed for manufacturing the wet granules, a food processor (MB-MM22 manufactured by Yamamoto Electric Corporation) was used. As illustrated in FIG. 1, first, the conductive material and the dispersant were poured into the stirring device, and were dry-stirred under the conditions of a stirring speed of 20 m/s and a time period of 120 seconds (Step ST11). Here, the stirring speed is the speed of the tip end of the stirring blade, and can be obtained from the length of the stirring blade and the number of rotations of the stirring blade per unit time. Next, the positive electrode active material was poured into the stirring device and was dry-stirred with the conductive material and the dispersant under the conditions of a stirring speed of the 20 m/s and a time period of 15 seconds (Step ST12).

In addition, as shown in Table 1 of FIG. 6, wet granules for Examples 1 to 5 and Comparative Examples 1 to 6 were manufactured by changing the stirring speed (peripheral speed) during the granulation stirring (Step ST13), and the stirring speed (peripheral speed) and the stirring time during the refinement stirring (Step ST14). Here, as shown in Table 1 of FIG. 6, the stirring speed (the second stirring speed) during the refinement stirring is faster than the stirring speed (the first stirring speed) during the granulation stirring.

For the obtained wet granules, as shown in Table 1 of FIG. 6, the malleability, average particle size, and bulk density were measured. The malleability was evaluated by a load on the wet granules at a film thickness of 350 μm using a malleability evaluation apparatus manufactured by Rix Corporation. The malleability evaluation apparatus is an apparatus which allows a predetermined amount of the wet granules to be interposed between a plate material and a wedge material, narrows the film thickness of the wet granules by gradually pressing the wedge material, and measures the load at the predetermined film thickness. Here, the amount of the wet granules for the positive electrode was 0.30 g in terms of solid content, and the amount of the wet granules for the negative electrode was 0.25 g in terms of solid content. The average particle size was measured by using a laser diffraction type dry particle size distribution meter (Microtrac particle size analyzers MT3000II manufactured by Nikkiso Co, Ltd.). Here, the average particle size is a particle size (so-called 50% particle size) at a cumulative value of 50% in a measured particle size distribution. The bulk density was measured by introducing the wet granules into a constant-volume container and measuring the mass thereof.

An electrode was manufactured from the wet granules obtained by using the manufacturing apparatus as illustrated in FIG. 3. As the current collector, an aluminum foil was used. Regarding the film-forming properties, in the formed electrode material layer, the absence or presence of pinholes or streaks was visually evaluated. As shown in Table 1 of FIG. 6, the absence of pinholes and streaks was evaluated as good, and the presence of pinholes or streaks was evaluated as unavailable.

As shown in Examples 1 to 5 of Table 1 of FIG. 6, in any case in which the average particle size was refined to 400 μm or smaller during the refinement stirring and the stirring time at the stirring speed (second stirring speed) during the refinement stirring was shorter than 5 seconds, the malleability of the wet granules was lower than 1 kN, and the film-forming properties were good. From this result, it is preferable that the bulk density of the wet granules is 0.8 g/mL or lower. The stirring time is preferably 3 seconds or shorter, and more preferably 1 second or shorter.

Here, in Example 3, since the first stirring speed was as high as 15 m/s, the amount of the wet granules attached to the stirring container was large, and thus the yield was poor. Therefore, it is preferable that the first stirring speed is 10 m/s or lower. Accordingly, the attachment of the wet granules to the stirring container is suppressed, and thus the yield is enhanced.

On the other hand, as shown in Comparative Examples 4 to 6, in a case where the stirring time at the second stirring speed was 5 seconds or longer, the bulk density of the wet granules was higher than 0.8 g/mL, and the malleability of the wet granules was 1 kN or higher and thus deteriorated, resulting in the consolidation of the wet granules. Therefore, pinholes were generated in the electrode material layer formed by rolling.

Figure 4:
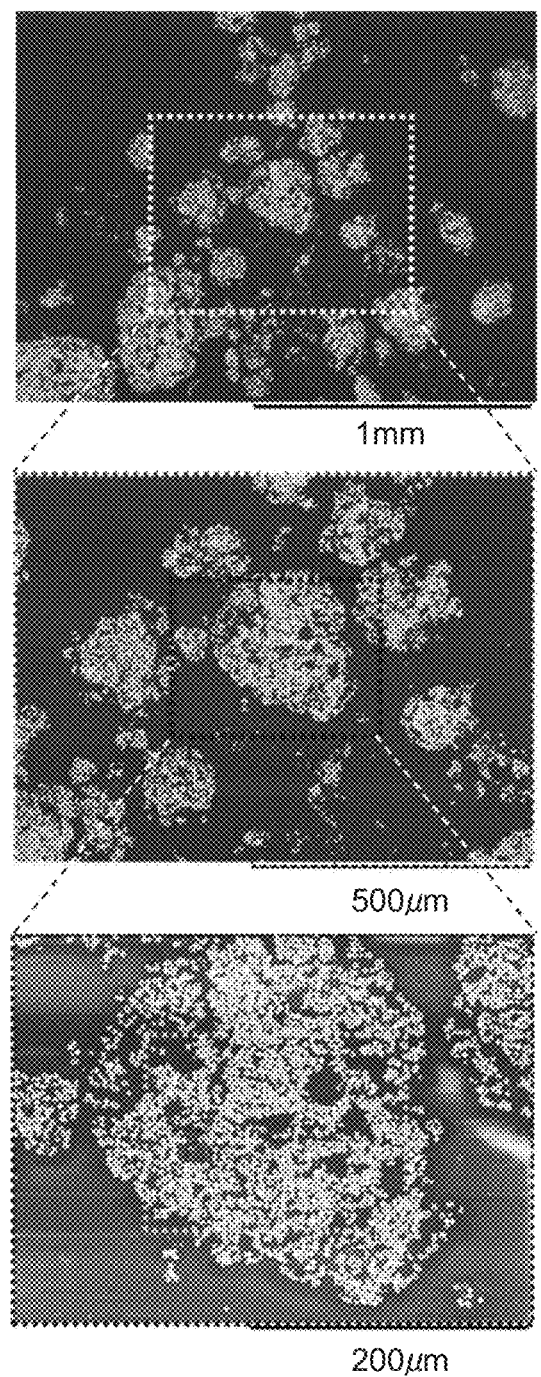
FIG. 4 is an SEM picture of the wet granules for the positive electrode according to Example 5.
Figure 5:
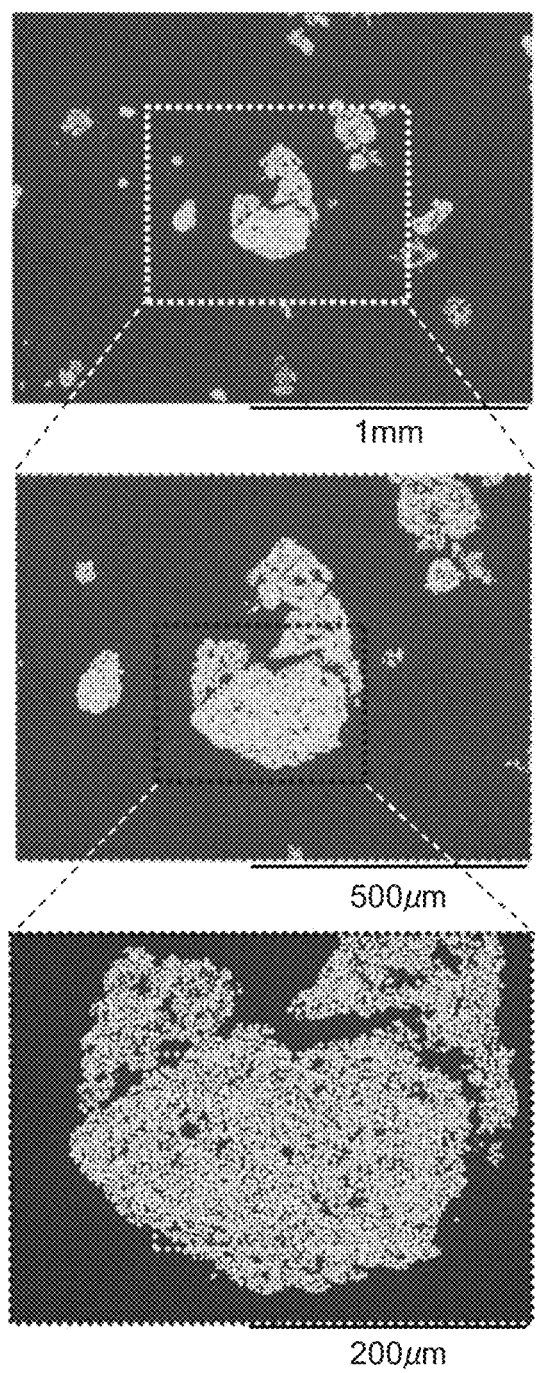
FIG. 5 is an SEM picture of the wet granules for the positive electrode according to Comparative Example 6.

FIG. 4 is an SEM picture of the wet granules for the positive electrode according to Example 5. FIG. 5 is an SEM picture of the wet granules for the positive electrode according to Comparative Example 6. From FIGS. 4 and 5, it was seen that the wet granules for the positive electrode according to Example 5 have a lower bulk density than that of the wet granules for the positive electrode of Comparative Example 6 and thus included a large number of pores in the granules.

In Comparative Example 1, both the granulation stirring and refinement stirring were performed at the same second stirring speeds as those of Comparative Examples 4 to 6 for 15 seconds, and the same results as those of Comparative Examples 4 to 6 were obtained. In Comparative Example 2, the refinement stirring was absent, and in Comparative Example 3, the refinement stirring was insufficient. Therefore, the average particle size of the wet granules was greater than 400 µm, and streaks were generated in the electrode material layer during rolling. As described above, it is preferable that the second stirring speed is 15 m/s or higher.

In Table 2 of FIG. 7, test conditions and results of Examples 6 and 7 and Comparative Examples 7 and 8 for the negative electrode are shown.

Amorphous carbon coated graphite (TP040 manufactured by Hitachi Chemical Co., Ltd.) was used as the negative electrode active material. Furthermore, carboxymethylcellulose sodium salt (CMC) (MAC800LC manufactured by Nippon Paper Industries Co., Ltd.) as the dispersant, and a styrene-butadiene copolymer (SBR) (C-41 manufactured by JSR Corporation) as the binding material were added. As the solvent, ion-exchange water was used.

In terms of solid content, the content of the negative electrode active material was 98.8 wt %, the content of the dispersant was 0.5 wt %, and the content of the binding material was 0.7 wt %. The solid content fraction was 75 wt %.

According to the manufacturing method of the wet granules for the negative electrode illustrated in FIG. 2, wet granules were manufactured. The same stirring device as that used for the positive electrode was used. As illustrated in FIG. 2, first, the active material and the dispersant were poured into the stirring device, and were dry-stirred under the conditions of a stirring speed of 20 m/s and a time period of 5 seconds (Step ST22).

As shown in Table 2 of FIG. 7, in Examples 6 and 7 and Comparative Examples 7 and 8, the stirring speed (peripheral speed) during the granulation stirring (Step ST23) was 5 m/s, and the stirring time was 15 seconds. The stirring speed (peripheral speed) during the refinement stirring (Step ST24) was 20 m/s. The wet granules were manufactured by changing the stirring time during the refinement stirring (Step ST24).

For the obtained wet granules, as shown in Table 2 of FIG. 7, the malleability, average particle size, and bulk density were measured. The evaluation methods are the same as those of the case of the positive electrode.

As shown in Examples 6 and 7 of Table 2 of FIG. 7, in any case in which the average particle size was refined to 400 µm or smaller during the refinement stirring and the stirring time at the stirring speed (second stirring speed) during the refinement stirring was shorter than 5 seconds, the malleability of the wet granules was lower than 1 kN, and the film-forming properties were good.

On the other hand, as shown in Comparative Examples 7 and 8, in a case where the stirring time at the second stirring speed was 5 seconds or longer, the malleability of the wet granules was 1 kN or higher and thus deteriorated, resulting in the consolidation of the wet granules. Therefore, pinholes were generated in the electrode material layer formed by rolling. As described above, even in the case of the negative electrode, as in the case of the positive electrode, in a case where the average particle size was refined to 400 µm or smaller during the refinement stirring and the stirring time at the stirring speed (second stirring speed) during the refinement stirring was shorter than 5 seconds, the film-forming properties were good.

The invention is not limited to the above-described embodiments, and can be appropriately modified without departing from the spirit.

What is claimed is:

1. A manufacturing method of an electrode comprising:
    forming wet granules by stirring a mixture of an electrode active material, a binding material, and a solvent; and
    forming an electrode material layer on a current collector by rolling the wet granules, wherein
    when the wet granules are formed, the electrode active material is granulated by stirring the mixture at a first stirring speed, and the granulated electrode active material is stirred at a second stirring speed that is faster than the first stirring speed, so as to be refined to an average particle size of 400 µm or smaller, and
    a stirring time at the second stirring speed is shorter than a stirring time at the first stirring speed and is shorter than 5 seconds.

2. The manufacturing method according to claim 1, wherein
    the first stirring speed which is a speed of a tip end of a stirring blade is 10 m/s or lower.

3. The manufacturing method according to claim 1, wherein
    the second stirring speed which is a speed of a tip end of a stirring blade is 15 m/s or higher.

4. The manufacturing method according to claim 1, wherein
    the stirring time at the second stirring speed is 3 seconds or shorter.

5. The manufacturing method according to claim 1, wherein
    a solid content fraction of the wet granules is 70 mass % or higher.

6. The manufacturing method according to claim 5, wherein
a ratio of a sum of the binding material and a dispersant in terms of solid content is 3 mass % or lower.

* * * * *